Patented Nov. 11, 1924.

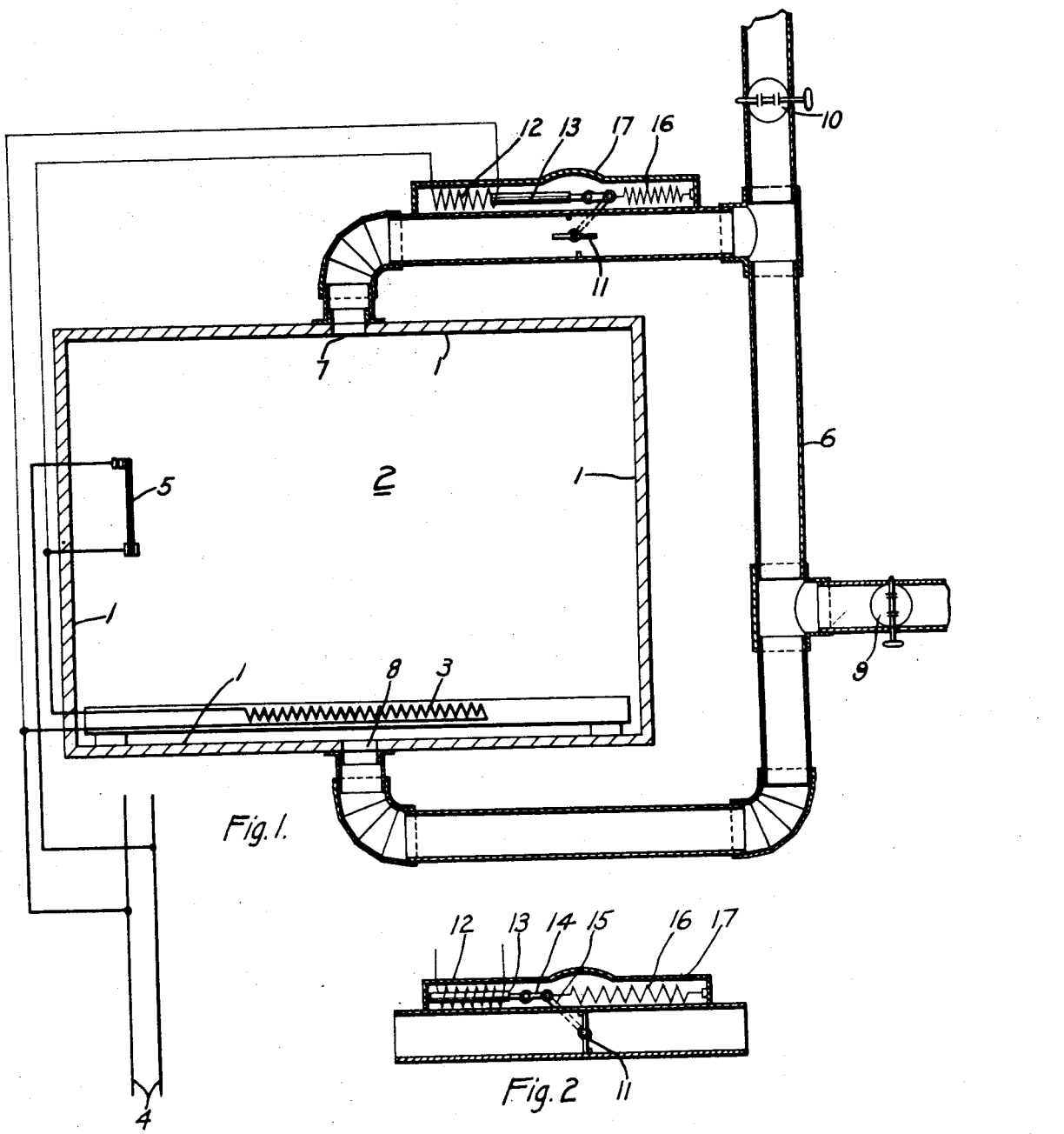

1,515,234

UNITED STATES PATENT OFFICE.

JAMES C. WOODSON, OF MANSFIELD, OHIO, ASSIGNOR TO WESTINGHOUSE ELECTRIC PRODUCTS COMPANY, A CORPORATION OF MICHIGAN.

EXHAUST VALVE FOR ELECTRICALLY-HEATED OVENS.

Application filed March 14, 1921. Serial No. 452,175.

*To all whom it may concern:*

Be it known that I, JAMES C. WOODSON, a citizen of the United States, and a resident of Mansfield, in the county of Richland and State of Ohio, have invented a new and useful Improvement in Exhaust Valves for Electrically-Heated Ovens, of which the following is a specification.

My invention relates to electrically heated apparatus and particularly to electrically heated ovens of the ventilated type, and it has for its object to provide automatic means for controlling the circulation of heated fluid through the oven chamber in accordance with the energization of the heating means.

In practicing my invention, I provide an oven with suitable heating means and control the heating means by a thermal device. I provide a suitably located damper which is electromagnetically actuated and is controlled by the thermal means which controls the heating means.

In the single sheet of drawings,

Figure 1 is a schematic view, in vertical cross-section, of an oven of the ventilated type comprising the device embodying my invention and Fig. 2 is a schematic view of the electromagnetically actuated damper comprising a part of the device embodying my invention.

A plurality of walls 1 enclose a suitable oven chamber 2, in which is located a heating means 3, here indicated as an electric resistor, energized from suitable supply conductors 4. A thermostat 5 is located in the chamber 2 to control the supply of energy to the resistor 3.

While I have shown the thermostat 5 as directly closing and interrupting the circuit through the resistor 3, it is to be understood that this is schematic only and that, wherever necessary, the thermostat 5 actuates a suitable relay (not shown) to control the supply of energy to the resistor 3.

A system of piping, indicated generally by the numeral 6, is so arranged in combination with the oven as to provide means for permitting a circulation of heated fluid through the oven chamber 2. An opening 7 is provided in the upper wall 1 for the egress of heated fluid, and a similar opening 8 is provided in the bottom wall of the oven to permit of the ingress of the heated fluid.

If it is desired to permit fresh air from the outside to flow through the oven chamber, a damper 9, provided in the piping 6, may be suitably regulated by the operator. If it is desired to permit some of the heated fluid to escape into the atmosphere after having passed through the oven chamber, this may be done by suitably moving a damper 10 located in a part of the pipe system 6 communicating with the atmosphere.

A damper 11 is mounted in a part of the pipe system 6 and is actuated by an electromagnetic relay comprising a coil 12 and a movable core member 13. The member 13 is suitably connected to the damper 11 by a plurality of suitable links 14 and 15. A spring member 16 is suitably connected to the links 14 and 15 and is so arranged as to maintain the damper 11 in its open position, substantially as indicated in Fig. 1, when the coil 12 is not energized. A suitable housing 17 may be provided to cover the moving parts of the damper-actuating means.

The circuit through the coil 12 is controlled by the thermostat 5 which, as above stated controls the circuit through the heating element 3.

The operation of the device is as follows: When the temperature in the oven is below a predetermined value, the movable member of the thermostat 5 is in operative engagement with the stationary contact terminal thereof, and the heating element 3 is, therefore, energized. At the same time, the coil 12 is energized and the position of the core member 13, the damper 11, spring 16 and the links 14 and 15 are substantially as indicated in Fig. 2.

Inasmuch as the damper 11 is in substantially its closed position, any tendency of the heated fluid in the oven chamber 2 to circulate out through the opening 7, the pipe system 6 and again into the chamber 2 through the opening 8, is prevented by the damper 11. The temperature of the oven chamber 2 is, therefore, quickly raised by reason of the heating element 3 being energized.

When the temperature in the oven chamber has reached a predetermined value, the thermostat 5 will cause the supply of energy through the heating element 3 to be interrupted and will simultaneously interrupt the supply of energy to the coil 12, thus permitting the damper 11 to be moved to its open position by the spring 16, as indicated in Fig. 1. This permits the heated fluid to circulate through the oven and the pipe system 6 and, if desired, part of this heated fluid may be permitted to escape into the atmosphere by manually moving the damper 10, or fresh air may be permitted to enter the pipe system by manually adjusting the damper 9, or any desired combination of admission and escape of heated fluid may be obtained by proper movement of the dampers 9 and 10.

It may be noted that the use of the device embodying my invention permits of bringing the oven up to its normal temperature in a shorter time than would be the case if free circulation of air were permitted, and also permits of bringing the temperature in the oven back to a predetermined value in a shorter time than would be the case if free circulation of air were not permitted through the oven chamber. Ventilation of the oven is of particular value in certain kinds of enameling ovens where the enameling fluid may contain a substance which volatilizes at normal temperatures and which volatilized substance may form an explosive mixture under certain conditions.

The use of the device embodying my invention permits of automatically preventing circulation during the time the heating element is energized, thus resulting in the heating element being energized for shorter periods of time than would be the case if the oven were ventilated, and it also permits of ventilating the oven when the heating element is not being energized, this control of the ventilation being automatic and in accordance with the energization of the heating element.

Various modifications may be made without departing from the spirit and scope of my invention, and I desire that only such limitations shall be placed thereon as are imposed by the prior art or are specifically set forth in the appended claims.

I claim as my invention:

1. In an electrically heated oven of the ventilated type, the combination with an oven chamber, electric heating means in said chamber and electro-magnetic means for controlling the circulation of heated fluid through said chamber, of a single thermally-actuated means for controlling the energization of said heating means and of said circulation-controlling means.

2. In an electrically heated oven of the ventilated type, the combination with an oven chamber, electric heating means for said chamber and means for controlling egress of air out of said chamber, of thermally-actuated means for controlling the energization of said heating means, and electromagnetic means, controlled by said thermally-actuated means, for preventing the egress of heated fluid under predetermined conditions of operation of said heating means.

3. In an electrically heated oven of the ventilated type, the combination with an oven chamber, electric heating means in said chamber, and means for permitting a circulation of heated fluid through said chamber, of thermally-actuated means for controlling the energization of said heating means, and electromagnetic means, controlled by said thermally-actuated means for preventing the circulation of heated fluid through said chamber when said heating element is energized.

4. In an electrically heated oven of the ventilated type, the combination with an oven chamber, electric heating means in said chamber, and electro-magnetically actuated means for controlling the circulation of heated fluid through said chamber, of a single thermally-actuated means for simultaneously causing the energization of said heating means, and of said electromagnetically actuated controlling means for preventing the circulation of heated fluid through said chamber.

5. In an electrically heated oven of the ventilated type, the combination with an oven chamber, electric heating means in said chamber, and electromagnetically actuated means for controlling the circulation of heated fluid through said chamber, of a single thermally-actuated means for simultaneously causing the deenergization of said heating means and for energizing said circulation-controlling means to permit the circulation of heated fluid through said chamber.

6. In an electrically-heated oven, the combination with an oven chamber, electric heating means in said chamber, thermally-actuated means for controlling said heating means and means for permitting a circulation of heated fluid through said chamber, of electromagnetically-actuated means controlled by said thermally-actuated means for preventing said circulation of heated fluid, said electromagnetically-actuated means being normally biased to its open position and actuated to its closed position when said heating-means is energized.

In testimony whereof, I have hereunto subscribed my name this 28th day of Feb., 1921.

JAMES C. WOODSON.